PULSE GENERATOR

Filed June 2, 1960

INVENTOR
HENRY R. FOGLIA

BY Frank L. Chadurjian
ATTORNEY

United States Patent Office 3,114,843

Patented Dec. 17, 1963

3,114,843
PULSE GENERATOR

Henry R. Foglia, North White Plains, N.Y., assignor to International Business Machines Corporation, New York, N.Y., a corporation of New York Filed June 2, 1960, Ser. No. 33,464
13 Claims. (Cl. 307—88)

This invention relates to pulse generators and more specifically to a pulse generator employing a saturable magnetic core and an asymmetrical impedance element exhibiting a reverse voltage breakdown characteristic.

Pulse generators of the prior art employing magnetic cores utilize inputs of different polarities to provide different polarity outputs. While these generators accomplish the desired function, a multiplicity of components and duality of phase inputs is required.

By constructing a pulse generator in accordance with the principles of this invention, the above objections are alleviated. A pulse generator of this invention comprises a saturable magnetic core having a first and a second input winding and an output winding thereon, an asymmetrical impedance device exhibiting a reverse voltage breakdown characteristic, and means connecting the input windings on the core in parallel and further connecting the impedance device in series with one of the input windings. More specifically, the input windings are wound in opposition on the core and are provided with an equal number of turns and the impedance element is made of the avalanche breakdown type so that input signals of one polarity having a first predetermined magnitude are insufficient to cause breakdown of the impedance element whereby outputs are induced of a similar polarity and output windings, but input signals of a second predetermined magnitude and same polarity, greater than the first predetermined magnitude, are of sufficient value to cause the impedance device to operate in its reverse voltage breakdown region whereby outputs are induced on the output winding of opposite polarity, the magnitude of which is determined by the breakdown penetration of the impedance element.

Accordingly, it is a prime object of this invention to provide a novel pulse generator.

Another object of this invention is to provide a novel pulse generator capable of providing pulses of opposite polarity when energized with signal pulses of the same polarity.

Yet another object of this invention is to provide a novel pulse generator employing an asymmetrical impedance device exhibiting a reverse voltage breakdown characteristic.

The foregoing and other objects, features and advantages of the invention will be apparent from the following more particular description of a preferred embodiment of the invention, as illustrated in the accompanying drawings.

Figure 1:
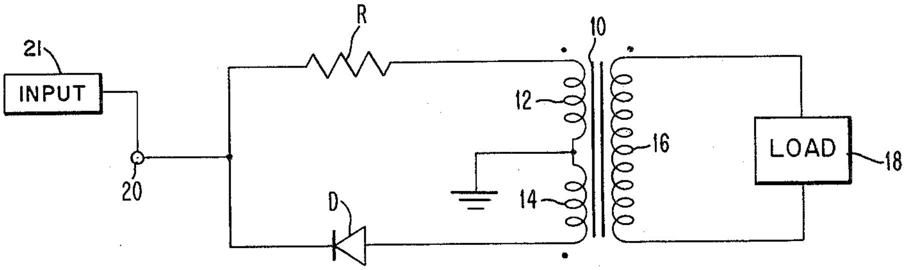
FIG. 1 is a schematic drawing of an embodiment of this invention.

Referring to the FIG. 1, an embodiment of this invention is shown wherein a saturable reactor core 10 having primary windings 12 and 14, and a secondary winding 16, is provided, with the secondary winding 16 connected to a load 18. The windings 12 and 14 are wound in opposition on the core 10 and both have one end grounded with the other end of the winding 12 connected to an input terminal 20 through a resistor R, while the other end of the winding 14 is also connected to the terminal 20 through a diode D.

Figure 2:
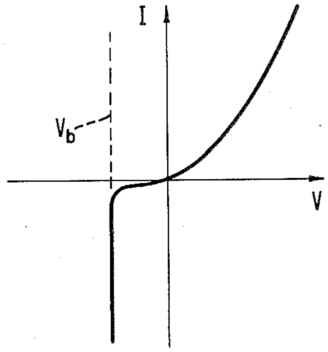
FIG. 2 is an illustration of the type characteristic displayed by the asymmetrical impedance device employed in the embodiment of FIG. 1.

The diode D is an avalanche breakdown diode such as a Zener diode, having a characteristic as is shown in the FIG. 2. Referring to the FIG. 2, a plot of current (I) versus voltage (V) for the diode D is shown. The forward characteristic of the diode D is typical of most diodes while the reverse characteristic shows a very little current flow until a voltage $-V_b$ is reached, at which time the current increases for increasing current with substantially constant voltage drop $-V_b$ across the diode D. The point $-V_b$ at which the curve changes is known as the breakdown voltage and this type characteristic is utilized where a constant voltage drop is desired for varying current magnitudes.

Referring to the FIG. 1, the circuit may be considered to operate, upon application of a voltage $V_{in}$ to the input terminal 20 thereof, in three different modes. In the first mode of operation, a voltage $V_{in}$ applied to the terminal 20 of a first predetermined magnitude which is insufficient to cause substantial current flow through the diode D in the reverse direction, in that the breakdown of voltage $-V_b$ has not been attained. Therefore, practically all current flow is through the resistor R and the winding 12 of the core 10. In this mode of operation a voltage is induced on the output winding 16 of a given polarity and applied to the load 18.

In the second mode of operation, an input $V_{in}$ having a magnitude greater than the first predetermined magnitude but less than a second predetermined magnitude causes operation of the diode D in a partial breakdown area whereby approximately half the current provided passes through the diode D and winding 14 while the remainder passes through the resistor R and winding 12. Since the magnetic fields provided to the core 10 are approximately equal and opposite, negligible voltage is induced on the output winding 16.

In the third mode of operation of the circuit, an input $V_{in}$ having a second predetermined magnitude, which is greater than the first predetermined magnitude causes the diode D to operate in its breakdown region as shown in the FIG. 2, thereby providing a low impedance path through the diode D and the winding 14 of the core 10 causing a voltage to be induced on the output winding 16 of opposite polarity, which is applied to load 18.

Figure 3:
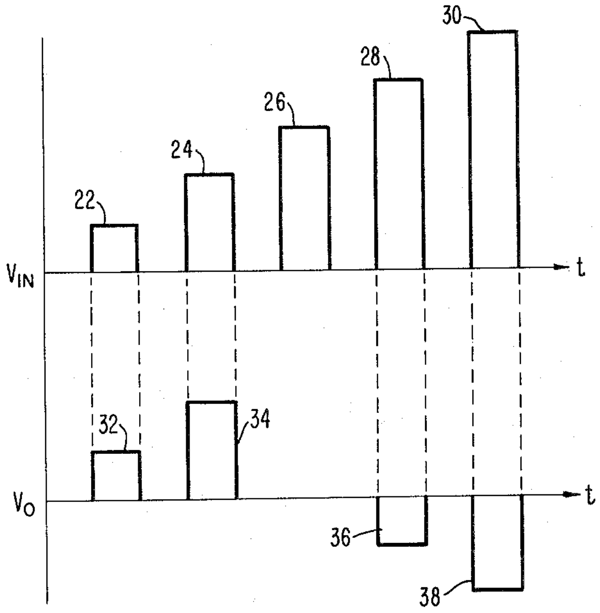
FIG. 3 illustrates the output produced in the circuit of FIG. 1 when energized by different input pulses of one polarity but differing magnitude.

More specifically, referring to the FIG. 3, there is shown a plot of different amplitude input pulses labelled $V_{in}$ having references 22, 24, 26, 28 and 30, and a plot of output voltages labelled $V_o$, obtained upon application of the different inputs $V_{in}$. Upon application of input pulse 22 an output pulse 32 is induced on the output winding 16 of substantially the same magnitude and polarity. With application of the input pulse 24 to the circuit of FIG. 1, an output pulse 34 is provided on the output winding 16 of substantially equal magnitude and the same polarity. Upon application of an input pulse 26 to the circuit of FIG. 1, an output to the load 18 is shown to be negligible providing operation of the circuit in the second mode described above. This may be explained as a condition of the circuit wherein the diode D is caused to have some breakdown and substantially half the current is caused to flow therethrough while the remaining half is caused to flow through the resistor R. Thus the windings 14 and 12 of the core 10 have substantially equal magnitudes of current flow therethrough providing zero net field to the core 10 and thus zero output voltage on the winding 16.

Upon application of the pulse 28 to the circuit of FIG. 1 the diode D is made to operate in its breakdown region for operation in the third mode, causing substantial current therethrough thereby providing an induced output on the winding 16 which is of a magnitude similar to the pulse 32 but of opposite polarity as is shown by a pulse 36. Application of the pulse 30 to the terminal 20 of FIG. 1 which is of greater magnitude than the pulse 28 then provides an output pulse 38 which is of substantially equal magnitude to the output pulse 34 but of opposite polarity.

Thus, application of the pulses 22 and 24 causes the circuit of FIG. 1 to operate in its first mode while application of the pulses 28 and 30 causes operation of the circuit in the third mode. It may be seen, that the circuit of FIG. 1 has particular utility when employed as a driver for a coincident selection magnetic core memory, and more particularly in memories wherein non-destructive readout by utilization of domain wall viscosity in magnetic elements is employed. By utilizing such a circuit to energize a particular selection line of a memory, wherein the load 18 may be considered a row or a column selection line, the output pulse 32 may be considered a half read select pulse and the output pulse 34 a full read select pulse. The output pulse 36 may then be a half write select pulse while the output pulse 38 may be a full read select pulse. The device has further utility as a detector as it is possible to detect the shape of the input pulse. For example, a ramp input could be detected because it would produce a doublet pulse on the output. A square pulse supplied to the input could give a negative pulse in the output.

While the invention has been particularly shown and described with reference to a preferred embodiment thereof, it will be understood by those skilled in the art that various changes in form and details may be made therein without departing from the spirit and scope of the invention.

What is claimed is:

1. A pulse generator comprising a saturable magnetic core, a first and a second input winding and an output winding coupled to said core, an asymmetrical impedance element exhibiting a reverse voltage breakdown characteristic and serially connected to said first winding, a uniform impedance element serially connected to said second winding, a source of input signals, and means for connecting said asymmetrical impedance element and said uniform impedance element to said source whereby said first and said second windings are arranged in parallel with respect to said source.

2. The generator of claim 1, wherein said first and second input windings have an equal number of turns.

3. The generator of claim 2, wherein said first and second input windings are wound in opposition on said core.

4. The generator of claim 3, wherein said asymmetrical impedance element is a Zener diode.

5. A generator comprising a saturable magnetic element, oppositely phased first and second input windings and an output winding coupled to said magnetic element, an asymmetrical impedance element exhibiting a reverse voltage breakdown characteristic and serially connected to said first input winding, an impedance element having uniform characteristics serially connected to said second input winding, input means for supplying pulses of given polarity and of predetermined magnitudes less than and greater than the breakdown voltage of said asymmetrical element, means including said impedance elements for connecting said input windings in parallel to said input means whereby the polarity of pulses developed across said output winding is determined by the respective magnitudes of said pulses supplied by said input means.

6. The generator of claim 5 wherein said asymmetrical impedance element is a diode made of semiconductor material.

7. The generator of claim 6 wherein said diode exhibits a reverse voltage avalanche breakdown characteristic.

8. A circuit for selectively distributing pulses of same polarity according to magnitude comprising input means for supplying pulses of varying magnitudes, terminal means connected to said input means for receiving said pulses, a first means and a second means between which said pulses are to be distributed, first impedance means and second impedance means connecting said terminal means to said first and said second means, respectively, said first impedance means exhibiting a reverse voltage breakdown characteristic whereby pulses of magnitude greater than its breakdown threshold are directed therethrough, said second impedance means exhibiting a uniform impedance characteristic less than that of said first impedance means in non-breakdown condition but greater than that of said first impedance means in breakdown condition whereby pulses of magnitude less than that of the breakdown voltage of said first impedance means are substantially totally directed along said second impedance means.

9. A pulse generator comprising a saturable magnetic element having first and second input windings and an output winding, load means connected to said output winding, input means for supplying pulses of varying magnitudes, terminal means connected to said input means for receiving said pulses, first impedance means connecting said terminal means to said first input winding, second means exhibiting a reverse voltage breakdown characteristic connecting said terminal means to said second input winding, said impedance means being operative to selectively direct pulses of predetermined magnitudes less and greater than the breakdown threshold of said second impedance means to said first and said second input windings, respectively, on a magnitude basis.

10. A pulse generator as defined in claim 9 wherein said first and said second input windings are oppositely phased whereby pulses of opposite polarity are developed across said output winding in accordance with the magnitude of said input pulses.

11. A pulse generator as set forth in claim 9 wherein said second impedance element is a Zener diode.

12. A pulse generator as set forth in claim 9 wherein the impedance characteristic of said first impedance element is substantially greater than that of said second impedance element in breakdown condition and substantially less than the magnitude of said second impedance element in non-breakdown condition.

13. A pulse generator as set forth in claim 12, wherein said second means further exhibits a partial breakdown characteristic and wherein the impedance characteristic of said first impedance element is substantially equal to that of said second impedance element in said partial breakdown condition.

References Cited in the file of this patent

UNITED STATES PATENTS

| | | |
|---|---|---|
| 2,785,236 | Bright | Mar. 12, 1957 |
| 2,874,293 | McMurren | Feb. 17, 1959 |
| 3,046,418 | Eachus | July 24, 1962 |